United States Patent [19]

McMullin

[11] Patent Number: 4,820,961

[45] Date of Patent: Apr. 11, 1989

[54] LINEAR MOTION SCREENED INDUCTANCE SENSORS

[75] Inventor: Francis McMullin, Clare, Ireland

[73] Assignee: Kollmorgen Corporation, Simsbury, Conn.

[21] Appl. No.: 188,475

[22] Filed: Apr. 29, 1988

[30] Foreign Application Priority Data

May 1, 1987 [IE] Ireland .................................. 1118/87

[51] Int. Cl.[4] .............................................. G05D 1/00
[52] U.S. Cl. .................................... 318/587; 180/167; 336/79
[58] Field of Search ................. 318/587; 180/167, 168, 180/169; 336/75, 79

[56] References Cited

U.S. PATENT DOCUMENTS

| | | | |
|---|---|---|---|
| 4,006,790 | 2/1977 | Kawano | 318/587 X |
| 4,079,803 | 3/1978 | Takada et al. | 318/587 X |
| 4,080,592 | 3/1978 | Zabler | 336/79 X |
| 4,236,093 | 11/1980 | Birnbaum | 324/207 X |
| 4,425,511 | 1/1984 | Brosh | 336/79 X |
| 4,502,006 | 9/1985 | Goodwin et al. | 324/233 X |
| 4,507,638 | 3/1985 | Brosh | 336/79 X |
| 4,714,124 | 12/1987 | Laib | 318/587 X |
| 4,737,698 | 4/1988 | McMullin | 318/653 |
| 4,742,283 | 5/1988 | Bolger | 318/587 |

*Primary Examiner*—Benjamin Dobeck
*Attorney, Agent, or Firm*—Morgan & Finnegan

[57] ABSTRACT

In a screened inductance sensor system having a drive winding energizable to set up an alternating magnetic drive field, a sense winding links the drive field and a screening element modulates the spatial distribution of the drive field, when in the vicinity of the sense winding. Variations in voltage induced in the sense winding provide an indication of the relative position of the screening element and the sense winding. The drive winding and the sense winding are accommodated in a displaceable portion of the sensor, and the screening element is fixedly located relative to the movable sensor portion. Modulation of the spatial distribution of the drive field occurs when the displaceable sensor portion is moved into the vicinity of the screening element. In application of the system to control of vehicles following a predetermined path, fixed screening elements may be located at spaced apart intervals along the path, where the vehicles are on tracks, to provide locational signals according as the vehicles pass these fixed screens. The system may also be applied to providing guidance and position information for a steerable vehicle, in which case two sense windings are used, one responsive to sidewise deviation from the intended path of travel, and the other sense winding providing a cycled output signal, which is counted to yield a measure of distance travelled.

22 Claims, 8 Drawing Sheets

LINEAR MOTION SCREENED INDUCTANCE SENSORS

BACKGROUND OF THE INVENTION

1. Field of the invention

The present invention relates to sensing systems, and in particular, to position sensors for providing signals indicative of the position of a moving member relative to some fixed datum. By appropriate processing of the position signals, further signals indicative of the speed of movement of the moving member relative to this datum may also be derived. Sensors of this kind are applicable to a multiplicity of uses. The invention is particularly directed to a linear embodiment of sensor especially suited to establishing the location of a moving member. The invention is further directed to the provision of a sensing system for monitoring the location of vehicles moving along a predetermined path, as well as the provision of systems for guiding moving vehicles and constraining them to follow such a predetermined path.

2. Description of the prior art

Position and speed sensors of the foregoing kind form the subject of co-pending U.S. patent application Ser. No. 789,147, now allowed. According to this Application, there is provided a sensor comprising a drive or exciting winding for establishing a forward or drive field, at least one secondary or sense winding in which a voltage may be induced in the presence of said forward or drive field, and at least one conductive screen within which eddy currents are generated in the presence of said forward or drive field to establish a counter-field opposing said forward or drive field, said at least one conductive screen and said at least one secondary or sense winding being displaceable relative to one another within said forward or drive field so that said at least one secondary or sense winding may be shaded by said at least one conductive screen to a varying extent to thereby vary the voltage induced in said at least one secondary or sense winding, the relative displacement of said at least one conductive screen and said at least one secondary or sense winding being limited to substantially a single direction of displacement, said drive or exciting winding being configured so that in the absence of said at least one conductive screen said forward or drive field is substantially even over said at least one secondary or sense winding in said single direction of relative displacement of said at least one conductive screen and said at least one secondary or sense winding, said at least one secondary or sense winding being a two-terminal winding, and said at least one conductive screen having a surface region which is substantially parallel to a notional surface defined by said at least one secondary or sense winding.

Said surface region of said at least one conductive screen may be substantially planar and said at least one secondary or sense winding may be a substantially flat winding defining a plane substantially parallel to said surface region, while said at least one screen and said at least one secondary or sense winding are then suitably relatively linearly displaceable.

In an advantageous construction of sensor according to said co-pending Application, there is a further secondary or sense winding the progressive shading of which during said relative displacement of said at least one conductive screen and said at least one secondary or sense winding proceeds in a manner substantially identical with the progressive shading of said at least one secondary or sense winding during said relative displacement, said further secondary or sense winding being disposed relative to said at least one secondary or sense winding so that the progressive shading of said further secondary or sense winding during said relative displacement is spaced apart from that of said at least one secondary or sense winding, the voltage variations in each said secondary or sense winding during said progressive shading preferably following a cyclic pattern and said further secondary or sense winding being disposed relative to said at least one secondary or sense winding so that said voltage variations are in phase quadrature.

In a favoured winding arrangement, said at least one secondary or sense winding has first and second coils, said coils being connected so that in the presence of said forward or drive field the voltage induced in the second coil in the absence of said at least one conductive screen is substantially equal in magnitude but opposite in polarity to the voltage induced in the first coil, said at least one secondary or sense winding preferably having a plurality of coils extending in said single direction of relative displacement and each successive coil in said single direction of relative displacement being wound in the opposite electrical sense to each adjacent coil.

In an especially favoured arrangement, said at least one secondary or sense winding has at least one coil having a pitch or extent in said single direction of relative displacement and said at least one conductive screen has a pitch or extent in said single direction of relative displacement which is substantially equal to the pitch or extent of said at least one coil, said at least one conductive screen having a dimension in a direction at right angles to said single direction of relative displacement which is substantially constant over said pitch or extent of said at least one conductive screen and said at least one secondary or sense winding having a dimension in a direction at right angles to said single direction of relative displacement which is substantially constant over said pitch or extent of said at least one coil, said screen dimension in said direction at right angles to said single direction of relative displacement being substantially equal to the maximum dimension of said at least one secondary or sense winding in said direction at right angles to said direction of relative displacement.

Alternatively, said at least one secondary or sense winding has at least one coil having a pitch or extent in said single direction of relative displacement and said at least one conductive screen has a pitch or extent in said single direction of relative displacement which is substantially equal to the pitch or extent of said at least one coil, said at least one conductive screen having a dimension in a direction at right angles to said single direction of relative displacement, said at least one secondary or sense winding having a dimension in a direction at right angles to said single direction of relative displacement, and at least one of said dimensions varying over the pitch or extent of said at least one conductive screen or the pitch or extent of said at least one coil so that successive incremental net changes in unscreened area of said at least one secondary or sense winding during said relative displacement are governed by a substantially sinusoidal function.

In an advantageous construction, said at least one secondary or sense winding is a printed circuit winding having first and second tracks disposed on opposite sides of a single board, each of said first and second tracks having a plurality of concentric turns, the turns of the first track extending inwardly from the first terminal of said at least one secondary or sense winding to an interconnection with the second track said interconnection passing through said board, and said second track extending outwardly from said interconnection to the second terminal of said at least one secondary or sense winding said first and second tracks being disposed in an aligned back-to-back configuration, and the cross-overs between successive turns of each of said first and second tracks being aligned with each other so that unbalanced electrical effects may be substantially minimized.

In a further aspect, said co-pending Application provides a sensor comprising a drive or exciting winding for establishing a forward or drive field, at least one secondary or sense winding in which a voltage may be induced in the presence of said forward or drive field, and a plurality of conductive screens within which eddy currents are generated in the presence of said forward or drive field to establish a counter-field opposing said forward or drive field, said plurality of conductive screens and said at least one secondary or sense winding being displaceable relative to each other within said forward or drive field so that said at least one secondary or sense winding may be shaded by said plurality of conductive screens to thereby vary the voltage induced in said at least one secondary or sense winding, the relative displacement of said plurality of conductive screens and said at least one secondary or sense winding being limited to substantially a single direction of displacement, said drive or exciting winding being configured so that in the absence of said plurality of conductive screens said forward or drive field is substantially even over said at least one secondary or sense winding in said single direction or relative displacement, said at least one secondary or sense winding being a two-terminal winding, and each of said plurality of conductive screens having a surface region which is substantially parallel to a notional surface defined by said at least one secondary or sense winding.

In yet another aspect, said co-pending Application provides position-measuring apparatus comprising two sensors, each having a drive or exciting winding for establishing a forward or drive field, at least one secondary or sense winding in which a voltage may be induced in the presence of said forward or drive field, and a plurality of conductive screens within which eddy currents are generated in the presence of said forward or drive field to establish a counter-field opposing said forward or drive field said plurality of conductive screens and said at least one secondary or sense winding of each of said sensors being displaceable relative to one another within said forward or drive field so that said at least one secondary or sense winding may be shaded by said plurality of conductive screens to a varying extent to thereby vary the voltage induced in said at least one secondary or sense winding, the relative displacement of said plurality of conductive screens and said at least one secondary or sense winding of each of said sensors being limited to substantially a single direction of displacement said single direction of displacement being the same direction for each of said sensors, said at least one secondary or sense winding of each of said sensors having a plurality of coils extending in said single direction of relative displacement and each successive coil in said single direction of relative displacement being wound in the opposite electrical sense to each adjacent coil and the number of conductive screens of one of said sensors differing from the number of conductive screens of the other of said sensors.

In a still further aspect, said co-pending Application provides a sensor comprising a drive or exciting winding for establishing a forward or drive field, at least two secondary or sense windings in which a voltage may be induced in the presence of said forward or drive field, and at least one conductive screen within which eddy currents are generated in the presence of said forward or drive field to establish a counter-field opposing said forward or drive field, said at least one conductive screen and said at least two secondary or sense windings being displaceable relative to one another within said forward or drive field so that each of said at least two secondary or sense windings may be shaded by said at least one conductive screen to a varying extent to thereby vary the voltage induced in said at least two secondary or sense windings, one of said at least two secondary or sense windings being oriented to provide a varying voltage output substantially indicative of the position of said at least one conductive screen in a first direction of relative displacement of said at least one conductive screen and said at least two secondary or sense windings, and the other of said at least two secondary or sense windings being oriented to provide a varying voltage output substantially indicative of the position of said at least one conductive screen in a second direction of relative displacement of said at least one conductive screen and said at least two secondary or sense windings.

Finally, there is also provided according to said co-pending Application a sensing system comprising a sensor having a drive or exciting winding for establishing a forward or drive field, at least one secondary or sense winding in which a voltage may be induced in the presence of said forward or drive field, and at least one conductive screen within which eddy currents are generated in the presence of said forward or drive field to establish a counter-field opposing said forward or drive field, said at least one conductive screen and said at least one secondary or sense winding being displaceable relative to one another within said forward or drive field so that said at least one secondary or sense winding may be shaded by said at least one conductive screen to a varying extent to thereby vary the voltage induced in said at least one secondary or sense winding, said relative displacement of said at least one conductive screen and said at least one secondary or sense winding being limited to substantially a single direction of displacement, said drive or exciting winding being configured so that in the absence of said at least one conductive screen said forward or drive field is substantially even over said at least one secondary or sense winding in said single direction of relative displacement of said at least one conductive screen and said at least one secondary or sense winding, said at least one secondary or sense winding being a two-terminal winding, and said at least one conductive screen having a surface region which is substantially parallel to a notional surface defined by said at least one secondary or sense winding, means for applying an alternating voltage to said drive or exciting winding, and means for processing the output signal from said at least one secondary or sense winding to provide a signal indicative of the relative disposition of said at least one conductive screen and said at least one secondary or sense winding.

A screened inductance sensor may be regarded, therefore, as a position measurement device in which inductive coupling between two windings is controlled by the position of a passive, conductive screen. Both windings may be stationary with respect to one another and may be fixed in an absolute sense also. Relative displacement takes place between the screen and the sense winding, or, normally in most constructions, relative to both windings. The output of the sensor thus indicates the position of the screen relative to the sense winding, or relative to the two mutually stationary windings.

Position and speed measurement systems based on the screened inductance principle are remarkable for the ease with which a diversity of sensor geometries, covering a wide range of shapes, sizes and accuracy levels can be designed and manufactured. This is a direct result of the inherent simplicity of the basic device and the materials used in its construction.

In a favoured position measuring configuration, a screened inductance sensor system has, therefore, in summary:
(a) a drive winding,
(b) means for energising the drive winding to set up an alternating magnetic drive field,
(c) at least one sense winding to link the drive field,
(d) a screening element for modulating the spatial distribution of the drive field and
(e) means for measuring variations in voltage induced in said at least one sense winding to provide an indication of the relative positions of the screening element and said sense winding.

BRIEF SUMMARY OF THE INVENTION

Such sensor systems may be provided in linear and rotational configurations. It is a particular object of the invention to provide advantageous linear embodiments of screened inductance sensors for use in association with, for example, automatically driven vehicles in a factory environment. It is a further object of the invention to provide an adaptation of a linear screened inductance sensor system offering a high degree of measurement accuracy.

According to the present invention, there is provided a sensing system comprising a drive or exciting winding for establishing a forward or drive field, at least one secondary or sense winding in which a voltage may be induced in the presence of said forward or drive field, and at least one conductive screen within which eddy currents are generated in the presence of said forward or drive field to establish a counter-field opposing said forward or drive field, said drive or exciting winding and said at least one secondary or sense winding being accommodated in a displaceable sensor portion and said at least one conductive screen being fixedly located relative to said displaceable sensor portion, said secondary or sense winding being shaded to a varying extent by said at least one conductive screen when said displaceable sensor portion is in the vicinity of said at least one conductive screen to thereby vary the voltage induced in said at least one secondary or sense winding and said at least one secondary or sense winding being oriented to provide a varying voltage output substantially indicative of the position of said displaceable sensor portion relative to said at least one conductive screen in a single direction of relative displacement of said displaceable sensor portion and said at least one conductive screen, said drive or exciting winding being configured so that in the absence of said at least one conductive screen said forward or drive field is substantially even over said at least one secondary or sense winding in said single direction of relative displacement of said displaceable sensor portion and said at least one conductive screen, said at least one secondary or sense winding being a two-terminal winding, and said at least one conductive screen defining a plane which is substantially parallel to a notional surface defined by said at least one secondary or sense winding.

Said drive and sense windings may be mounted or accommodated in a casing or housing attachable to a vehicle or other movable object, and said screen or screening element may be aligned with the path of movement of the vehicle, so that said at least one sense winding may be shaded by said at least one screening element when the housing or casing is carried into the vicinity of said screening element by movement of the vehicle.

The vehicle may be a tracked or guided unit and a plurality of screening elements may be provided along its path of movement. A plurality of vehicles may operate on the same track, being spaced apart by control means for actuating individual vehicle drive means in response to position information provided by the sensor system of the invention.

Said housing or casing may have spaced apart upper and lower portions, one of which accommodates the drive winding and the other of which accommodates said at least one sense winding or a plurality of sense windings, and each of a plurality of screening elements may be positioned so that it is located in the space between said upper and lower portions of the housing or casing when the displaceable sensor portion is aligned with that screening element. Alternatively, a single portion housing may contain both the drive winding and the secondary winding or windings, and the conductive screen is positioned so that it is located adjacent to said single housing portion when said displaceable sensor portion is aligned with said screen. Preferably, said at least one conductive screen has a substantially planar surface region defining said plane parallel to said notional surface defined by said at least one secondary or sense winding.

In another aspect, the invention provides a position sensing system for tracked vehicles comprising a drive or exciting winding for establishing a forward or drive field, at least one secondary or sense winding in which a voltage may be induced in the presence of said forward or drive field, and at least one conductive screen within which eddy currents are generated in the presence of said forward or drive field to establish a counter-field opposing said forward or drive field, said drive or exciting winding and said at least one secondary or sense winding being accommodated in a displaceable sensor portion attachable to a tracked vehicle and said at least one conductive screen being aligned with the intended path of movement of the tracked vehicle, said secondary or sense winding being shaded to a varying extent by said at least one conductive screen when said displaceable sensor portion is moved into the vicinity of said at least one conductive screen to thereby vary the voltage induced in said at least one secondary or sense winding and said at least one secondary or sense winding being oriented to provide a voltage output indicative of the presence of said displaceable sensor portion in the vicinity of said at least one conductive screen, said drive or exciting winding being configured so that in the absence of said at least one conductive screen said forward or drive field is substantially even over said at least one secondary or sense winding in the direction of travel of said tracked vehicle, said at leas one secondary or sense winding being a two-terminal winding, and said at least one conductive screen having a surface region which is substantially parallel to a notional surface defined by said at least one secondary or sense winding.

In addition to the fixed screening elements provided along the path of movement of the tracked vehicles, each vehicle operating on the track may have a further screening element attached to the vehicle, located to shade said at least one sense winding of the vehicle to its rear in the direction of motion, should that vehicle approach too closely, the arrangement thus providing an anti-collision feature.

Said fixed screening elements may be placed at a series of equally spaced apart locations along the path of movement of the displaceable sensor portion, so as to provide intermittent position information for the vehicle or unit to which the displaceable sensor portion is attached. Each said screening element may be a portion of conductive material placed at an elevation above the track or roadway on which the vehicle operates for alignment with said space between said upper and lower spaced apart housing or casing portions which accommodate the drive and sense windings.

Alternatively, the screening elements may consist of a series of conductive regions, each of which may be mounted on, for example, a tape or a length of strip material. Said tape or strip material may be stainless steel. A Vernier configuration may be provided, in which two parallel series of screening elements each made up of conductive regions are disposed side by side along the path of movement of the displaceable sensor portion one such series having one conductive region less than the other said series over a particular length of said path. Two sense windings are then provided, each of which is aligned in use with one of said series of conductive regions and is dimensioned to match the pitch of said one of said series of conductive regions with which it co-operates in use of the sensor system. The control means of the system is then arranged to provide a unique indication of the disposition of said displaceable sensor portion from the output signals of the two side-by-side windings.

In this variant, the invention accordingly provides a sensing system comprising a drive or exciting winding for establishing a forward or drive field, two secondary or sense windings in each of which a voltage may be induced in the presence of said forward or drive field, and two series of conductive screens, eddy currents being generated in said conductive screens in the presence of said forward or drive field to establish a counter-field opposing said forward or drive field, said drive or exciting winding and said two secondary or sense windings being accommodated in a displaceable sensor portion and said two series of conductive screens being fixedly located relative to said displaceable sensor portion, each of said secondary or sense windings being shaded to a varying extent by a conductive screen of a respective one of said two series of conductive screens when said disposable sensor portion is moved into the vicinity of said conductive screen to thereby vary the voltage induced in said secondary or sense winding and each of said two secondary or sense windings being oriented to provide a varying voltage output substantially indicative of the position of said displaceable sensor portion relative to said two series of conductive screens in a single direction of relative displacement of said displaceable sensor portion and said two series of conductive screens said drive or exciting winding being configured so that in the absence of said conductive screens, said forward or drive field is substantially even over said two secondary or sense windings in said single direction of relative displacement of said displaceable sensor portion and said two series of conductive screens, each of said two secondary or sense windings being a two-terminal winding, each of said conductive screens having a surface region which is substantially parallel to a notional surface defined by said at least one secondary or sense winding and the number of conductive screens of one of said series of conductive screens differing from the number of conductive screens of the other of said series of conductive screens.

In any configuration of the sensor system of the invention, said at least one secondary or sense winding may have a phase loop or coil wound in one electrical sense and an anti-phase loop or coil wound in the opposite electrical sense so that in the presence of said forward or drive field, the voltage induced in the anti-phase coil in the absence of said at least one screening element is substantially equal in magnitude but opposite in polarity to that induced in the phase coil. Such an arrangement facilitates the derivation of linear or sinusoidal demodulated signals by, inter alia, the provision of appropriate coil shapes or configurations.

The foregoing feature of the invention is particularly relevant to the following embodiment of the sensor system of the invention, in which its application to the guidance and position control of automatic guided vehicles is set out. In this case, the screening element or elements are defined by a conductive track or a series of conductive regions extending along a predetermined path on the surface on which the vehicle operates. The displaceable sensor unit is located in proximity to this conductive track or the conductive regions, and contains both the drive winding and one or more sense windings, all of the windings being therefore above the screening element, rather than the drive winding being to one side of it and the sense winding on its other side, as in the case of the previously described configurations.

In this adaptation, the invention provides a guidance system for steerable vehicles comprising a drive or exciting winding for establishing a forward or drive field, at least one secondary or sense winding in which a voltage may be induced in the presence of said forward or drive field, and at least one conductive screen within which eddy currents are generated in the presence of said forward or drive field to establish a counter-field opposing said forward or drive field, said drive or exciting winding and said at least one secondary or sense winding being accommodated in a displaceable sensor portion attachable to a vehicle to be guided by the system and said at least one conductive screen being aligned with an intended path of movement of said vehicle, said secondary or sense winding being shaded to a varying extent by said at least one conductive screen when said displaceable sensor portion is in the vicinity of said at least one conductive screen to thereby vary the voltage induced in said at least one secondary or sense winding and said at least one secondary or sense winding being oriented to provide a varying voltage output substantially indicative of the position of said displaceable sensor portion relative to said at least one conductive screen in a single direction of relative displacement of said displaceable sensor portion and said at least one conductive screen, said drive or exciting winding being configure so that in the absence of said at least one conductive screen said forward or drive field is substantially even over said at least one secondary or sense winding in said single direction of relative displacement of said displaceable sensor portion and said at least one conductive screen, said at least one secondary or sense winding being a two-terminal winding, and said at least one conductive screen defining a plane which is substantially parallel to a notional surface defined by said at least one secondary or sense winding.

If guidance only is required, the screening element may be a continuous strip of conductive material and a single sense winding is provided, which has phase and anti-phase coils aligned at right angles to the longitudinal direction of the conductive strip, so that deviations of the vehicle from a path of movement in which the displaceable sensor portion is aligned with the screening strip leads to a correcting output from the sense winding. This output may be applied to steering means of the vehicle to maintain it on its correct path.

If both steering and distance or position information are required, then the screening element is made up of a series of conductive regions, and a second sense winding is provided, which has phase and anti-phase coils arranged in alignment with the direction of travel. Lateral deviations from the path of motion required of the vehicle are detected by the first sense winding, while travel or distance information is provided by the second winding in a similar manner to that already described in connection with earlier configurations of the invention as the sense winding output passes through a succession of output signal cycles according as the vehicle travels over successive conductive regions. The conductive track may be provided in a multiplicity of ways, in that the thickness of conductive material required is very small. Accordingly a copper-coated flexible tape may be glued to a floor, thus facilitating easy alteration of the path followed by the vehicles, or alternatively, the conductive layer may be painted onto the floor, as required. Where the screening element is made up of a series of conductive regions, these may be formed on an adhesive tape for application to the floor. Alternatively automated painting means may be employed for applying the conductive regions to the floor in sequence and at the appropriate spacing each conductive region being equally spaced from each adjacent conductive region.

The invention also encompasses an alternative conductive screen configuration in which at least one of a plurality of conductive screens is defined by a two-terminal loop of conductive material, and switch means are provided for connecting the terminals of said two-terminal loop to close said two-terminal loop for flow of eddy currents therethrough in the presence of said at least one secondary or sense winding. Said at least one of said plurality of conductive screens may be one of a first plurality of two-terminal loops of conductive material, said first plurality defining a portion of a first intended path of movement for said vehicle, and the system then also comprises a second plurality of two-terminal loops of conductive material, said second plurality defining a second path of movement for said vehicle, said second path deviating from said first intended path of movement, switch means being provided for each two-terminal loop of said first and second pluralities of two-terminal loops for closing said each loop for flow of eddy currents therethrough, the switch means of each of said first plurality of two-terminal loops being closed for guiding said vehicle along said first intended path of movement and the switch means of each of said second plurality of two-terminal loops being closed to cause said vehicle to deviate from said first intended path of movement along said second path of movement. In this way, an arrangement for causing a vehicle to deviate onto an alternative path of movement or side track may be provided.

In a final aspect, the invention provides a screened inductance sensor system comprising a drive or exciting winding for establishing a forward or drive field, means for energising the drive winding to set up an alternating magnetic field, at least one secondary or sense winding in which a voltage may be induced in the presence of said forward or drive field, at least one conductive screen within which eddy currents are generated in the presence of said forward or drive field to establish a counter-field opposing said forward or drive field, said drive or exciting winding and said at least one secondary or sense winding being accommodated in a displaceable sensor portion and said at least one conductive screen being fixedly located relative to said displaceable sensor portion, said secondary or sense winding being shaded to a varying extent by said at least one conductive screen when said displaceable sensor portion is moved into the vicinity of said at least one conductive screen to thereby vary the voltage induced in said at least one secondary or sense winding and said at least one secondary or sense winding being oriented to provide a varying voltage output substantially indicative of the position of said displaceable sensor portion relative to said at least one conductive screen in a single direction of relative displacement of said displaceable sensor portion and said at least one conductive screen, said drive or exciting winding being configured so that in the absence of said at least one conductive screen said forward or drive field is substantially even over said at least one secondary or sense winding in said single direction of relative displacement of said at least one displaceable sensor portion and said at least one conductive screen, said a least one secondary or sense winding being a two-terminal winding, said at least one conductive screen defining a plane which is substantially parallel to a notional surface defined by said at least one secondary or sense winding, and the system comprising means for measuring said varying voltage output of said at least one secondary or sense winding to provide an indication of the relative position of the displaceable sensor portion and said at least one conductive screen.

BRIEF DESCRIPTION OF THE DRAWINGS

The invention will now be described having regard to the accompanying drawings, in which.

DETAILED DESCRIPTION OF THE DRAWINGS

The basic elements of a screened inductance transducer are at least two normally stationary windings and a displaceable, passive, conductive screen whose position controls the mutual coupling between the windings. The effect on which such sensors are based has, surprisingly, found no widespread use in current commercial position measurement systems. It has obvious advantages of simplicity, in particular because of the passive nature of the moving element.

Figure 1:
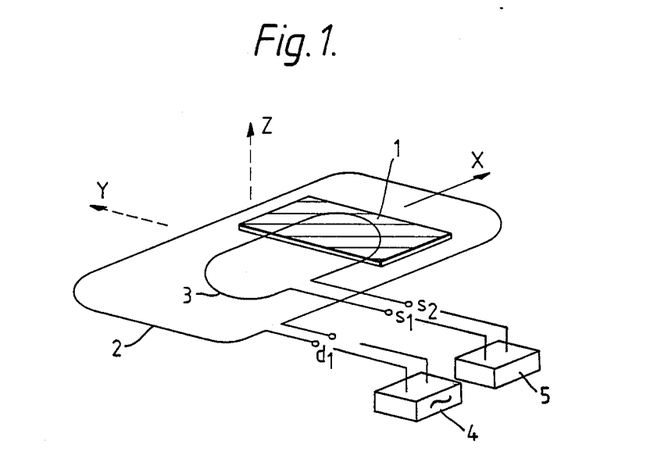
FIG. 1 is a schematic pictorial view of a basic planar configuration of screened inductance sensor illustrative of the basic principles of the invention.

An elementary geometry of transducer is illustrated in FIG. 1, which shows a screen 1, a drive coil or winding 2 which in operation is normally excited by an oscillator, schematically indicated by reference 4, and a sense or measurement coil or winding 3. Also depicted in schematic manner in FIG. 1 is a signal processing means 5, adapted to receive signals from the sense winding 3 of the sensor and operate on them as required in order to provide a desired output, or outputs, which may be indicative of screen position, the rate of screen displacement relative to the sense winding, or both. While it is frequently desirable that the screen be physically interposed between the windings, this is not a necessary condition for operation. As the screen moves, it shades the sense coil from the drive field to a varying extent and hence controls the voltage induced in the sense winding.

Automatic transfer of parts between workstations on assembly lines is now commonplace. Screened inductance sensors or transducers may be applied in such areas. Accordingly, the present invention is especially directed to constructions of screened inductance sensor in which the relative displacement of a screen of a sensing system and a secondary or sense winding thereof takes place in substantially a single direction of displacement. The invention is also particularly directed towards linear planar constructions of screened inductance sensor.

Rail-guided vehicles are frequently used in automatic transfer applications, in particular where the mass of the load is large, such as for example, automobile bodies. In a particular automated welding line parking control of the vehicles at predetermined stations was achieved by the use of linear potentiometers, whose sliders ran on a fixed mechanical rail. Parking positions at workstations were indicated by the minimum point of a 'V' shaped groove cut in the rail. Required parking accuracy was a few millimeters. The system used was simple, but very inflexible, and suffered from wear problems on the potentiometer.

Figure 2A:
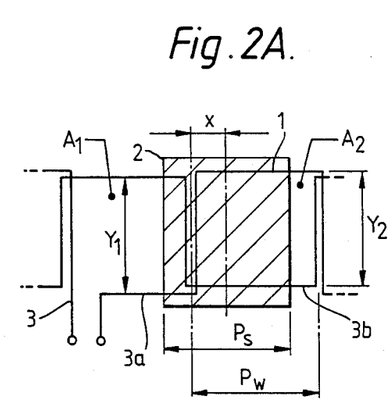
FIG. 2A shows a sense winding arrangement applicable to many practical installations of linear motion screened inductance sensors

In the application of a screened inductance sensor to the control of guided vehicles, the technique and configuration shown in FIG. 2A is most suitably employed. The sense winding 3 is made up of a series of connected coils $3a$, $3b$ wound in anti-phase to each other. This results in a null output in the absence of the screen or when it is centrally located, as will be apparent from the representation of the synchronous demodulation of the signal from the transducer depicted in FIG. 2B.

The configuration of sense winding shown in planar form in FIG. 2A is adapted for piecewise linear modulation of output signals. The sense winding 3 is laid out in a series of generally rectangular loops or coils extending in the direction of relative screen and secondary or sense winding displacement, the successive loops or coils $A_1$, $A_2$ of the winding 3 being in phase/anti-phase, and the winding is shaded by the generally rectangular screen 2, which is of substantially the same dimensions as each loop or coil of the winding. The drive winding, not shown in this schematic view, establishes a substantially even field distribution over the area of the sense coils, at least along the axis of motion in the direction of relative displacement. This relative displacement takes place in the direction in which the coils or loops of the sense winding are laid out.

Figure 2B:
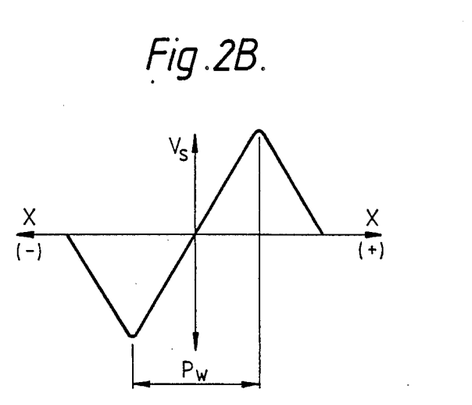
FIG. 2B shows the demodulated output signal obtainable from the arrangement of FIG. 2A.

The pitch of the sense winding in this single direction of relative displacement is designated by $P_w$ and the span $P_s$ of the generally rectangular screen in this direction of relative displacement is approximately the same as the winding coil span. The width of the screen in the direction at right angles to that of relative displacement of the screen and sense winding is substantially the same as or slightly greater than the transverse dimension of each sense winding coil. Linear ramp modulation is therefore achieved in sense winding output, as described in said co-pending Application. In practical constructions of sensor according to the present invention, a multiplicity of screens may be used, the screens being spaced apart by a distance substantially equal to the coil pitch. In such an arrangement, with the use of concentrated, full pitch sense windings and full pitch screens, the cross-sectional areas of unscreened magnetic flux (strong field) located between the screens and the cross-sectional areas of screened flux (weak field) underlying the screens linking with the sense winding, vary in a piecewise linear manner with the displacement of the screens. For steady motion, the demodulated sense voltage will approach a triangular waveform, as shown in FIG. 2B. Triangular output waveshapes of this kind allow derivation of a speed signal by analog differentiation or by differencing, and also facilitate derivation of digital position signals.

Figure 3A:
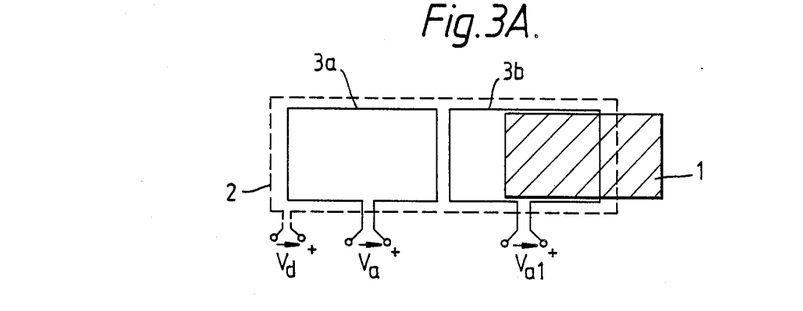
FIG. 3A shows a screened inductance sensor arrangement especially suitable for the control of guided vehicles.
Figure 3B:
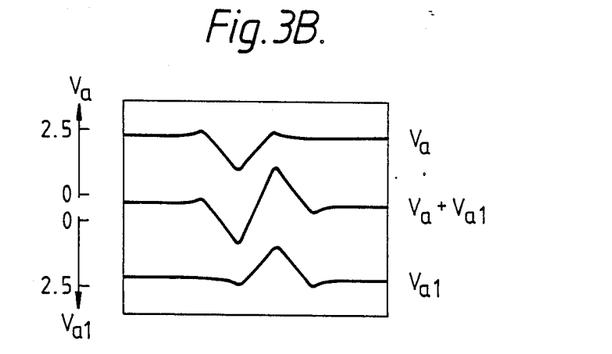
FIG. 3B shows actual output signals from a sensor of the type shown in FIG. 3A.
Figure 3C:
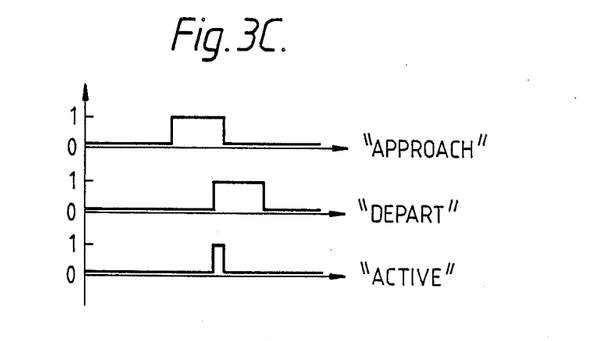
FIG. 3C shows logic signals derived from the output signals of FIG. 3B, FIGS. 4A and 4B show a sensor in accordance with FIG. 3 mounted on a railed automatic vehicle, in front and top views.

FIG. 3B illustrates actual outputs from such an elementary geometry of screened inductance sensor, the transducer itself being shown in FIG. 3A and consisting of drive coil 2, sense coils 3a, 3b, and screen 1. Separate connections are taken from the phase 3a and antiphase 3b coils, which can then be used individually or series connected at will. FIG. 3B shows demodulated waveforms as the screen is moved quickly past the transducer. The voltages Va and Va1 have opposite polarities and are phase displaced from each other. Screening efficiency is approximately 50%. When added together the waveforms cancel completely, except in the region where the screen has modulated the magnitude of one or the other. The middle portion of Va+Va1 is highly linear and centered on zero. It is an ideal parking control signal. When it is used as the velocity demand input, the drive will decelerate linearly to rest at the zero point of Va+Va1. However, it is necessary to have a means of identifying the central region of the waveform. This can be achieved by comparing the individual voltages Va and Va1 with fixed references, to give logic signals identified as "Approach" and "Depart", as indicated in FIG. 3C. The "Active" region at the overlap of these logic signals indicates the central portion of Va+Va1.

Figure 4A:
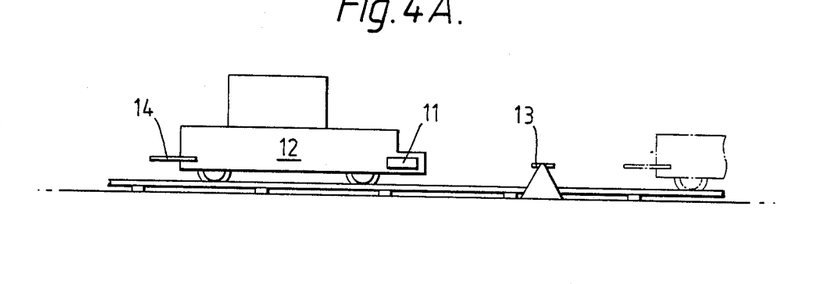
Figure 4B:
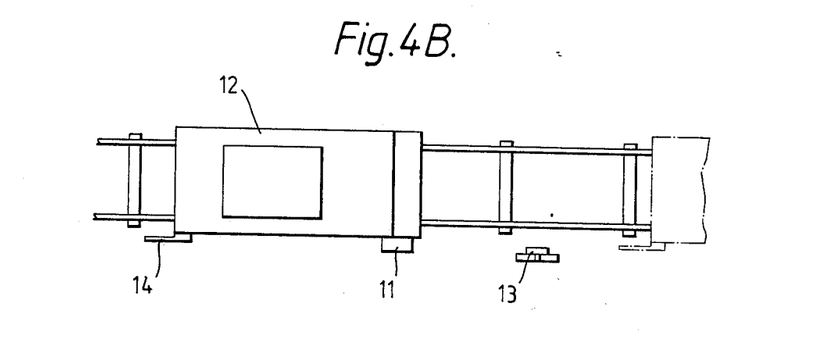

FIGS. 4A and 4B show a sensor winding portion 11 mounted on a typical tracked or railed vehicle 12. "Parking plate" 13 is a strip of conductive material, such as aluminium, mounted at the side of the path of movement of the vehicle and at the correct height to interact with the winding portion 11 at the desired stopping position. Provision can be made for a small adjustment in the position of the plate to fine tune the parking point. An "anti-collision plate" 14 is provided on the rear of each vehicle, which will engage with the sensor winding portion 11 of any other vehicle approaching from behind, causing such vehicle to stop in a controlled manner by effectively indicating to the sensor control system the presence of a "dummy" parking position.

Figure 5:
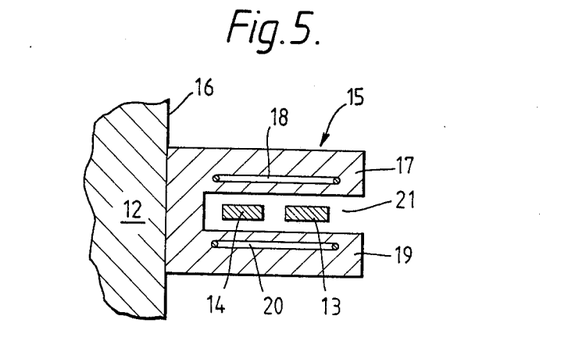
FIG. 5 is a cross-sectional end view of the sensor winding portion and the screens for the vehicular sensor application of FIGS. 4A and 4B.

FIG. 5 shows a cross-section of the sensor winding portion 11 and screens 13 and 14. A forked protective casing 15 extends laterally outward from the side 16 of vehicle 12. The upper limb 17 of the casing houses drive winding 18, which is energised to establish a uniform field extending downwardly through casing 15, in the lower limb 19 of which sense winding 20 is accommodated. Parking screen 13 and anti-collision screen 14 are arranged to pass through the gap 21 between the upper and lower limbs 17 and 19 of casing 15, to shade sense winding 20. Thus in this configuration of the sensing system of the invention, each of the screening elements 13 and 14 has a width transverse to the direction of relative displacement of the screen and sense winding less than the overall dimension of the sense winding in this direction.

Figure 6:
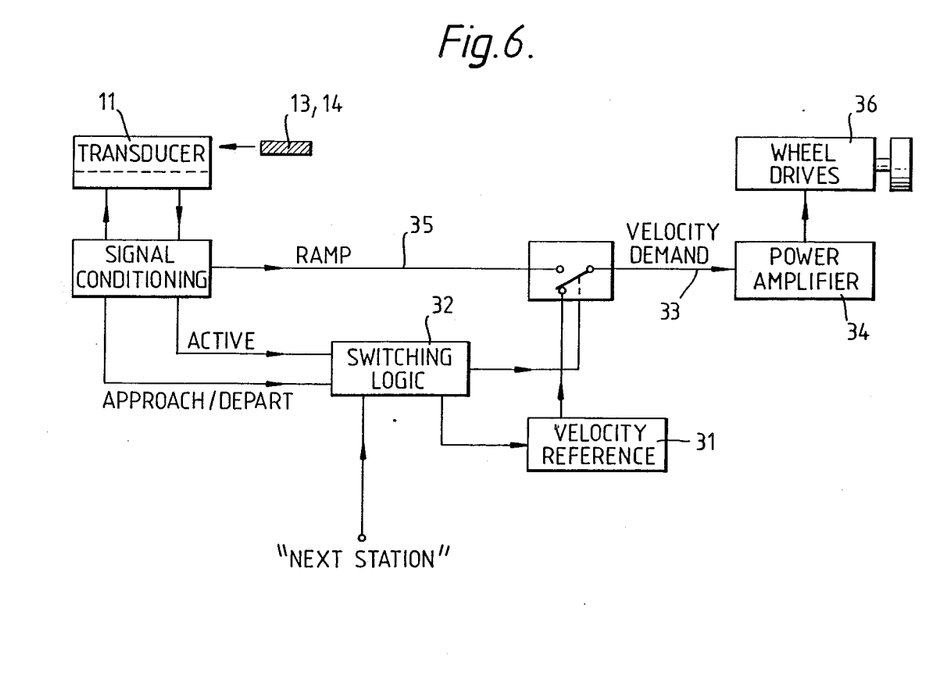
FIG. 6 is an outline schematic diagram of a control system for the vehicular sensor system of FIGS. 4A and 4B, FIGS. 7A and 7B show an automatic guided vehicle (AGV) in front and top views.

FIG. 6 shows an outline control system for the arrangement of FIGS. 4A and 4B. Between stations, vehicle 12 travels at a predetermined cruising speed, set by the velocity reference 31. An "Approach" signal applied to logic unit 32 by transducer 11 causes the reference speed to be reduced or decelerated to a suitable approach value. An "Active" transducer output signal switches the velocity demand signal input to power amplifier 34 at 33 to the control of the position ramp 35 (Va+Va1), for parking. A "Next Station" command returns control to the velocity reference 31, and causes the vehicle to accelerate to cruising speed. The velocity reference is implemented by means of an operational amplifier, some switching components, and some passive components.

The essence of the system is simplicity. In a world that is increasingly digital, local positioning loops such as this are hardly fashionable. However, since in the end the command signal to the wheel drives 36 is analog, in any system it is only a question of where the digital interface should be. The external "Next Station" command may, of course, come from a central computer controlling the movement of a number of vehicles.

Many automatic guided vehicles do not run on rails, of course. A standard guidance technique is to use a wire buried a short distance under the surface of the floor and excited with a high frequency A.C. signal. Sensors in the vehicle detect this signal, and steering is controlled such that the vehicle runs on a central path over the wire. The basic screened inductance sensor shown in FIG. 3A can also be used in a vehicle guidance application. Again the central portion of Va+Va1 forms an ideal control signal, because of its linearity.

Figure 7A:
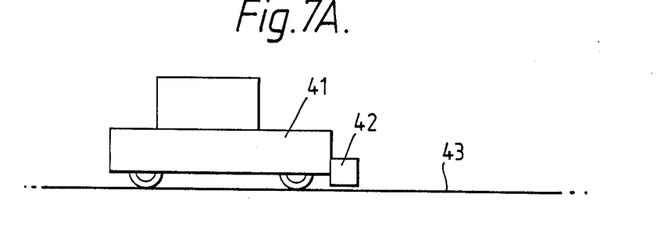
Figure 7B:
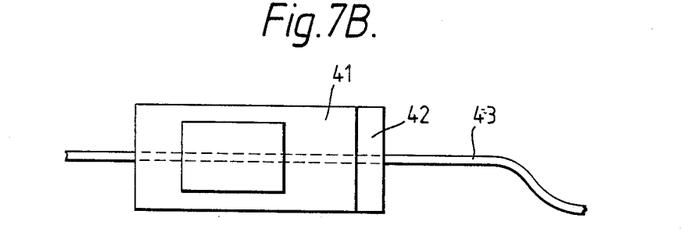
Figure 8A:
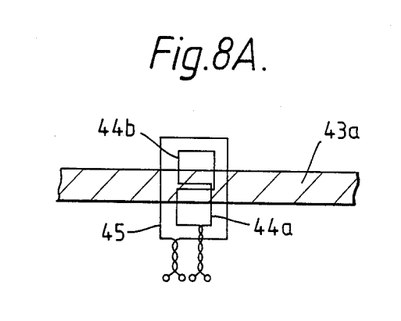
FIGS. 8A and 8B show sensor head details for the AGV control application of FIGS. 7A and 7B, for steering only (FIG. 8A) and for steering and distance (FIG. 8B) adaptations.
Figure 8B:
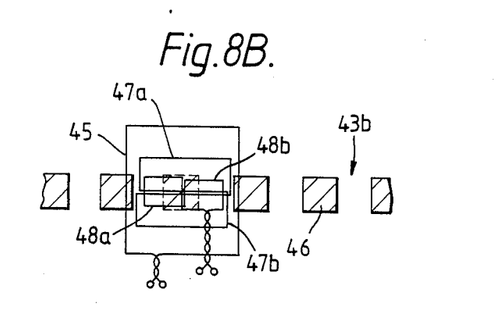

FIGS. 7A and 7B show an automatically guided vehicle (AGV) using the sensor system of the invention, and FIGS. 8A, 8B', 8C and 8D show details of different sensor configurations which can be used. In each case, vehicle 41 is guided by a sensor 42 responding to a guidance track 43. In FIG. 8A the guidance track 43a is a continuous strip of conductive material in which case the sensor head will respond only to lateral motion, the sense winding coils 44a, 44b being appropriately disposed in phase/anti-phase in a direction at right-angles to the direction in which the continuous strip 43a extends, as also shown in the Figure. Drive winding 45 establishes the necessary field. The sense coils 44a and 44b are accordingly disposed side-by-side with respect to the direction of motion. Thus if the vehicle deviates to one side or other of its intended path an imbalance is established in the output signals from the phase/antiphase sense winding coils, to provide a signal which is input to the steering mechanism of the AGV to correct the deviation. Similarly, at curves or bends, the sense winding output serves to provide steering guide signals to cause the AGV to adhere to the path defined by guidance strip 43a.

In FIG. 8B, the guidance track 43b is formed from a series of successive squares 46 of conductive material. A double sense winding 47, 48 is used in this case, designed to respond to lateral and longitudinal motion. The 'steering' winding 47 has a span in the direction of motion such that the nett screening underneath it always amounts to the area of one square, and its phase 47a and anti-phase 47b coils are disposed side-by-side vis-a-vis the direction of motion, as in the case of coils 44a, 44b of FIG. 8A. Thus it will only respond to lateral motion. The 'distance' winding 48 on the other hand is specifically designed to respond to longitudinal motion and can be used to calculate the distance travelled by the vehicle. This can be done by counting the number of sensor cycles, and interpolating on the slopes of the ramp waveform. Each sense winding 47 and 48 has, of course, phase and anti-phase coils in the usual manner to give the required null control signal, as already described for winding 47. The coils 48a, 48b of winding 48 are aligned in the direction of motion to give the required distance information, each distance increment corresponding to passing over one conductive square 46 of track 43b and one non-conductive space between squares. Each such distance increment represents a complete cycle of output from the phase/anti-phase distance sense winding coils, for input to the vehicle distance control system.

Figure 8C:
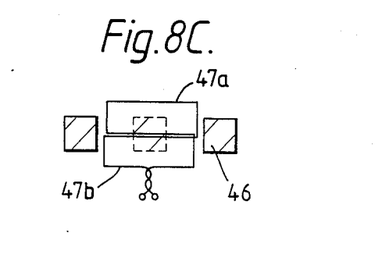
FIGS. 8C and 8D show screen and sense winding relationships for steering and distance respectively.
Figure 8D:
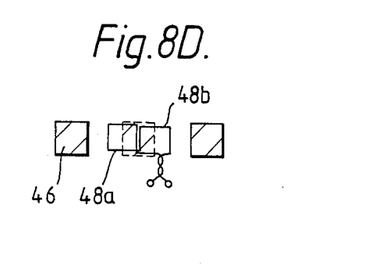

Referring now to FIG. 8C, only the steering winding 47 is shown in position over a square 46 of track 43b. The side-by-side disposition of the phase/anti-phase coils, 47a, 47b, with respect to the direction of travel is apparent, as is the overall span in the direction of travel of the steering coil 47, which equates to the dimension in the direction of travel of one square 46 and one space between the squares. Thus steering coil 47 only develops an imbalance in its output if there is lateral deviation by the vehicle 41 from its intended path of travel as defined by track 43b. FIG. 8D shows in similar manner only the distance recording coil 48b. As is shown in the drawings, the phase/anti-phase coils 48a, 48b, of this winding are disposed in alignment with the direction of travel so that as motion takes place, first one of the coils and then the other passes over each square 46. Accordingly during forward motion, the output of distance sense winding 48 goes through a complete cycle for each pass of the sensor over a square and an intervening space between squares of track 43b.

The screens described above can be made by a variety of techniques. For example, the continuous strip type can be formed from a series of short lengths of punched-out copper sheets, held together with rivits to form articulated joints. Given a sufficiently high excitation frequency on the drive coil, the thickness of the screens can be reduced in practice to a fraction of a millimeter of copper. This then facilitates the use of a continuous strip of material, which can be formed to follow the required guide path and stuck to the floor, without sectionalisation and rivetting. Use of conductive paints represents a further variant allowing the ultimate in flexibility of application. In this case, the guide track may be painted on to the floor, for example, by mechanical means, along a line set out and marked in advance. The interrupted guide track 43b, as shown in FIG. 8B, can be implemented by similar type techniques, namely by painting or by conductive squares 46 being attached to the floor by adhesive.

The advantages of the screened inductance sensor over conventional technology in this application reside in particular in the ease with which it may be applied. The passive nature of the guide track removes the need for burying the track to secure its protection. Minor damage to the track will not interfere with its functioning. Electrical noise emissions from an active guide wire are eliminated. A surface-mounted guide track greatly reduces factory down-time for installation, and the system can readily be reconfigured. The possibility of incorporating a "distance travelled" measurement increases the level of intelligence which can be built into the vehicle.

Figure 9A:
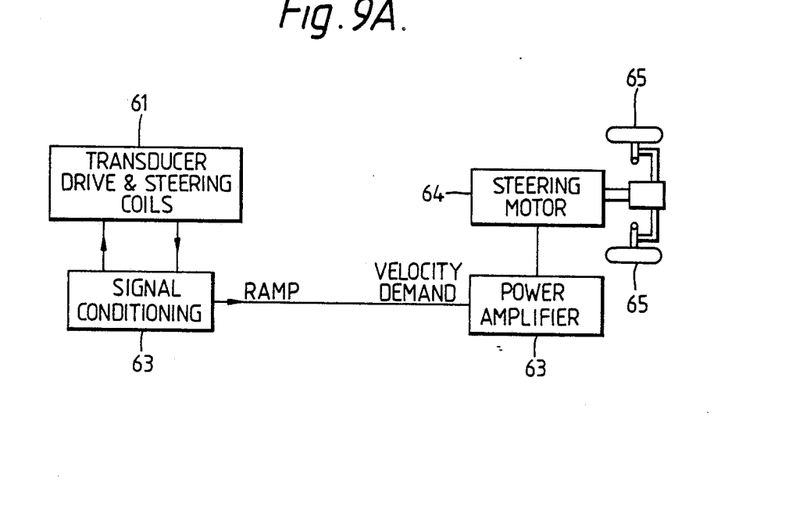
FIGS. 9A and 9B show outline schematic diagrams of the control systems for steering and distance travelled for the AGV control application described in regard to FIGS. 7A to 8D, FIGS. 10A, 10B and 10C illustrate path switching arrangements for an automatic guided vehicle, such as described in regard to FIGS. 7A to 9B.

FIGS. 9A and 9B show in schematic form respective control arrangements for vehicle steering and distance travelled outputs for the sensing system of FIGS. 7A to 8D. As shown in FIG. 9A, the transducer drive and steering coils, designated by reference 61, produce, via signal conditioning unit 62, a "ramp" output, of the kind shown in FIG. 3B, assuming that the system is operating on the central linear portion of the waveform only. When the vehicle is centrally located with respect to the guidance track, the value of this ramp output signal is zero. Any deviation to the left or to the right from the intended path of movement will lead to a positive or negative correction signal being output from signal conditioning unit 2. This correcting signal then forms a velocity demand input to power amplifier 63, which in turn drives steering motor 64, to displace the orientation of steerable wheels 65 and achieve rapid corrections of the direction of travel. The magnitude of the correcting signals from the transducer will determine the intensity of the velocity input signal applied to the steering motor and the rate therefore at which it corrects any steering deviation.

Figure 9B:
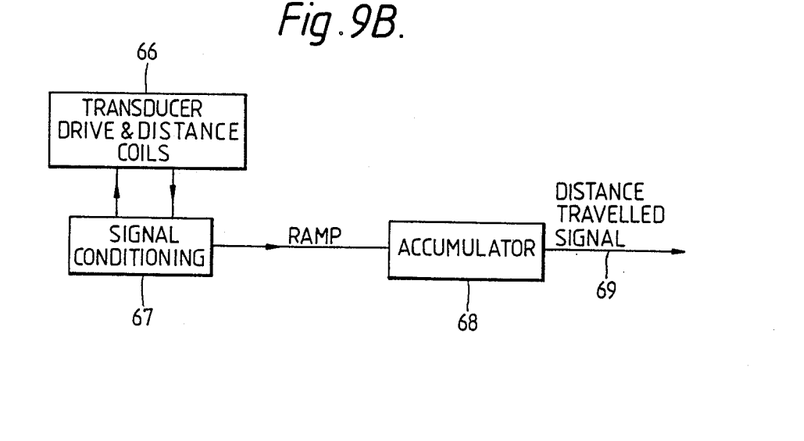

The distance recording arrangement shown in FIG. 9B operates in a generally similar manner so far as derivation of a transducer output signal is concerned. The drive and distance coils are designated by reference 66, and the output of signal conditioning unit 67 consists of a series of cyclical ramp signals, produced as the vehicle runs over successive square guidance tiles or areas 46 (FIG. 8D), the distance travelled being measured in accumulator 68 by counting the number of ramp cycles. Each ramp may also be sub-divided to give more precision. The output of accumulator 68 is a distance travelled signal 69 which may be forwarded to suitable display means or a recording medium, depending on the requirements of the circumstances. In a favoured arrangement, the distance sensor is provided with two sense or measurement windings, the coils of which are spaced apart to give two ramp signals arranged in quadrature, thereby facilitating counting and in particular cycle sub-division for especially precise distance measurement.

Figure 10A:
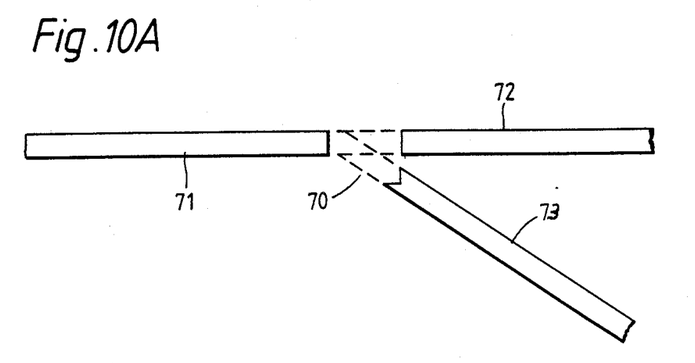
Figure 10B:
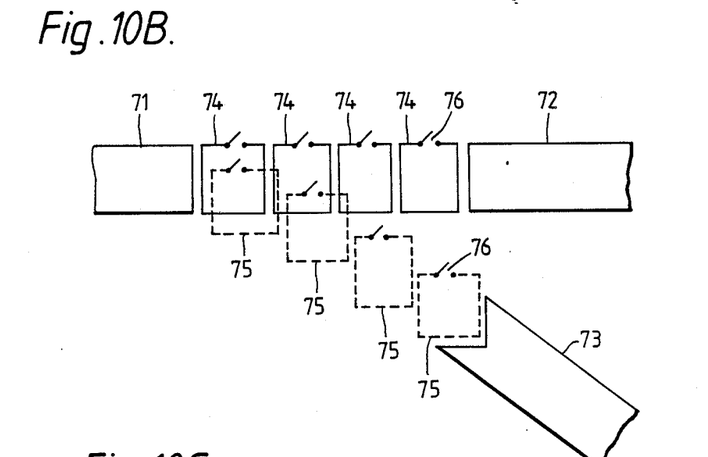
Figure 10C:
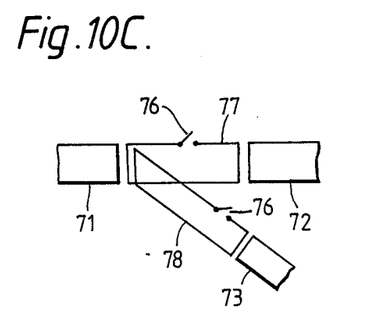

FIGS. 10A to 10C show an arrangement for causing a guided steerable vehicle to change from one predetermined path of movement to another. The arrangement corresponds to a switch or a set of points in a railed installation. As shown in FIG. 10A, a deviation region 70 of a guide track is approached by track section 71 and is succeeded, on a main or straight track, by section 72, with a deviating or side track section 73 leading away from the switch region 70. FIG. 10B shows an enlargement of the switch region. The arrangement in this region is based on the fact that a closed loop of wire also acts as a screen in preventing flux penetration. This is increasingly true as the size of the loop gets relatively smaller. Accordingly, the guide track is defined for the main line through the switch region 70 by a series of loops 74, each of which incorporates an individual openable and closable electrical contact or switch 76, so that each individual loop can be switched "on" or "off" by closing or opening the loop using the electrical contact. The electrical contact 76 may be a mechanical switch, a reed relay, or a semi-conductor switch. When all of the loops 74 are switched on, a vehicle arriving at the deviation or switch region 70 will travel straight through from track section 71 to track section 72.

A further series of loops which may be described as deviation or side track loops, are designated by references 75 and shown in dotted outline. If the approaching vehicle is required to take the side track, then contacts 76 on these loops are closed, and those for the main track loops 74 opened. The main track loops are now ineffective as screens, and the vehicle will be guided by the screening effect of loops 75 so that it moves onto the side track 73. The arrangement shown in FIG. 10B uses a series of small loops arranged in line with the main track sections, which are formed of continuous strips or squares such as the squares 46 of previous Figures. Each loop 74 has an individual switch. In the alternative arrangement of FIG. 10C, respective single loops 77, 78, each of appropriate shape, are used for both the main track and the side track switch portions.

These loops of wire constitute the screen or screen portions in the region of the track switches or points. A similar screening arrangement may also be provided at other locations along the vehicle route, but preferably the use of loops is confined to deviating or diverting regions such as switches of sets of points where a side track diverges. In general, screens of continuous conductive material represent a more convenient, although non-limiting, exemplification of the screening aspect of the sensing system of the present invention.

In modern robotics and automation there are also many applications where measurement of absolute position over long distances (e.g. 20 m) is required. There are few satisfactory existing solutions to this need. A Vernier type screened inductance transducer for this purpose offering an advantageous arrangement will now be outlined.

The Vernier effect requires that two measurements be made on scales which are themselves non-absolute. For example, if a main scale of 100 cycles is used over a 20 m travel, each resulting 20 cm segment can be accurately subdivided. However, on start-up it is not possible to know which of the 100 such segments is being subdivided. If, however, a parallel Vernier scale of 101 cycles is used, absolute position can be deduced, essentially by a process of subtraction. For example, at the half-way mark (10 m) the main scale will indicate 0.0 (from a full scale of deflection of 1.0), while the Vernier scale will indicate 0.5. At other points the calculations are more complex, but in every case well within the scope of modern electronic logic. In general, the higher the Vernier ratio, the more difficult and exacting the calculations become. On the other hand, a high Vernier ratio reduces the length of the individual measurement cycles and makes for a more compact transducer head. Coarse-fine scales can also be used to give absolute readings over long travels, but these too will tend to result in long transducer measurement heads.

Figure 11A:
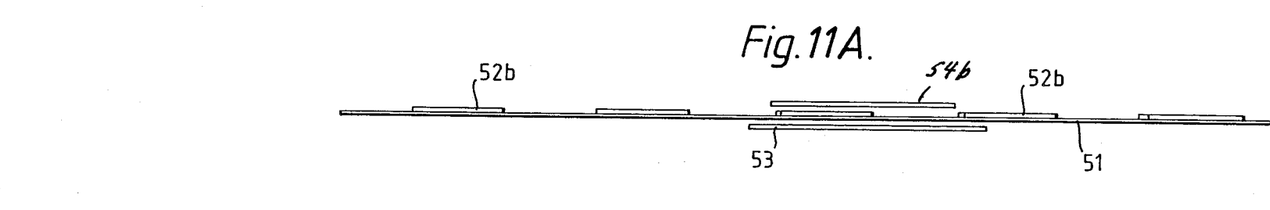
FIGS. 11A, 11B and 11C show respectively a Vernier-scale embodiment of according to the invention in side and top views (FIGS. 11A and 11B) and a detail of the sense winding (FIG. 11C).
Figure 11B:
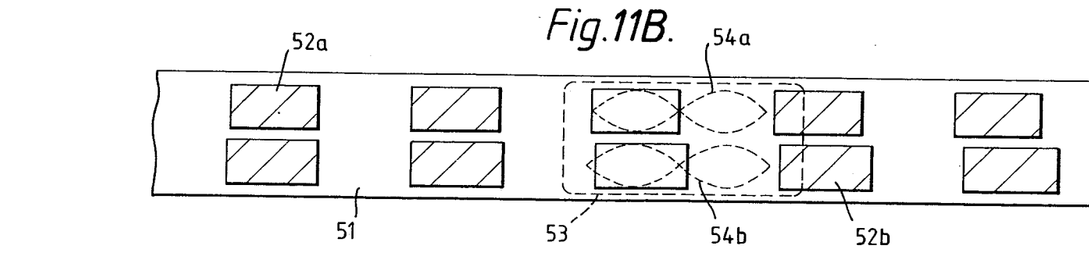
Figure 11C:
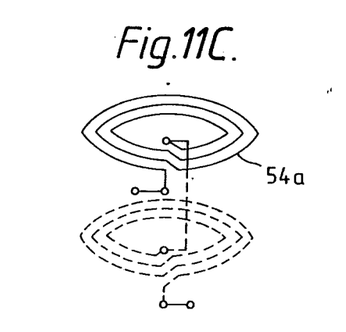

FIGS. 11A, 11B and 11C show the elements of a Vernier screened inductance transducer. A stainless steel tape 51 carries two series of copper screens 52a, 52b, accurately spaced apart and attached to it. The tape is tensioned and stretched out over the measurement length. The tape runs through a sensor head containing a drive winding 53 and sense windings 54a, 54b. The system is configured for sine/cosine modulation. The outputs are fed through separate R/D converters and manipulated to extract absolute information on start-up.

The uppermost series of screens 52a as the screens appear in the top view of FIG. 11B are slightly more closely spaced in the direction of relative sense winding and screen displacement than the lowermost series of screens 52b. Thus in a given length of strip 51, for N screens 52b, there are N+1 screens 52a. Sense winding 54a for the series of screens 52a has a dimension in the direction of travel corresponding to the spacing of these screens. Sense winding 54b for the lower series of screens has a slightly longer dimension in this direction, as shown in the drawing, corresponding to the slightly greater spacing of screens 2b. The requirement for sinusoidal modulation necessitates a coil configuration for each of the phase and anti-phase coils of the kind now described for FIG. 11C.

A detail of half of a sense winding 54a is shown in FIG. 11c. Practical windings for this type of device are usually made by printed circuit techniques. The process is described in detail for a rotary device in said co-pending Application. The track patterns are generated by numerical techniques and fed directly to a photoplotter, where the manufacturing artwork is produced. The detail shown in the diagram is the general form chosen for sinusoidal type windings. Multiple concentric coils are used to increase sensitivity, with a further complementary return path on the reverse side of the printed circuit board. Sense winding 54b is similar.

Vernier techniques may be implemented for a variety of transducer types. A principal advantage of the screened inductance sensor in this application is again the passive nature of the moving element. It would be very cumbersome to implement any such long travel device with double active elements.

I claim:

1. A sensing system comprising a drive or exciting winding for establishing a forward or drive field at least one secondary or sense winding in which a voltage may be induced in the presence of said forward or drive field, and at least one conductive screen within which eddy currents are generated in the presence of said forward or drive field to establish a counter-field opposing said forward or drive field, said drive or exciting winding and said at least one secondary or sense winding being accommodated in a displaceable sensor portion and said at least one conductive screen being fixedly located relative to said displaceable sensor portion, said secondary or sense winding being shaded to a varying extent by said at least one conductive screen when said displaceable sensor portion is in the vicinity of said at least one conductive screen to thereby vary the voltage induced in said at least one secondary or sense winding and said at least one secondary or sense winding being oriented to provide a varying voltage output substantially indicative of the position of said displaceable sensor portion relative to said at least one conductive screen in a single direction of relative displacement of said displaceable sensor portion and said at least one conductive screen, said drive or exciting winding being configured so that in the absence of said at least one conductive screen said forward or drive field is substantially even over said at least one secondary or sense winding in said single direction of relative displacement of said displaceable sensor portion and said at least one conductive screen, said at least one secondary or sense winding being a two-terminal winding, and said at least one conductive screen defining a plane which is substantially parallel to a notional surface defined by said at least one secondary or sense winding.

2. A sensing system according to claim 1, wherein said drive or exciting winding and said secondary or sense winding are accommodated in a casing or housing attachable to a vehicle or other movable object, and said at least one conductive screen is aligned with an intended path of movement of said vehicle or other movable object, so that said at least one secondary or sense winding is shaded by said at least one conductive screen when the housing or casing is carried into the vicinity of said at least one conductive screen by movement of said vehicle or other movable object.

3. A sensing system according to claim 2, wherein said housing or casing has spaced apart upper and lower portions, one of which accommodates said drive or exciting winding and the other of which accommodates said at least one secondary or sense winding, and said at least one conductive screen is positioned so that it is located in a region between said spaced apart upper and lower portions of the housing or casing when said displaceable sensor portion is aligned with said at least one conductive screen.

4. A sensing system according to claim 2, wherein said housing or casing has a single portion containing both the drive or exciting winding and said at least one secondary or sense winding, and said at least one conductive screen is positioned so that it is located adjacent to said single housing or casing portion when said displaceable sensor portion is aligned with said at least one conductive screen.

5. A sensing system according to claim 1, comprising a second secondary or sense winding oriented to provide a varying voltage output substantially indicative of the position of said displaceable sensor portion relative to said at least one conductive screen in a second direction of relative displacement of said displaceable sensor portion and said at least one conductive screen.

6. A sensing system according to claim 5, wherein each of said at least one secondary or sense winding and said second secondary or sense winding has a phase loop or coil wound in one electrical sense and an anti-phase loop or coil wound in the opposite electrical sense, so that in the presence of said forward or drive field, the voltage induced in each anti-phase coil in the absence of said at least one conductive screen is substantially equal in magnitude but opposite in polarity to that induced in each phase coil.

7. A sensing system according to claim 1, wherein said at least one conductive screen has a substantially planar surface region defining said plane parallel to said notional surface defined by said at least one secondary or sense winding.

8. A position sensing system for tracked vehicles comprising a drive or exciting winding for establishing a forward or drive field, at least one secondary or sense winding in which a voltage may be induced in the presence of said forward or drive field, and at least one conductive screen within which eddy currents are generated in the presence of said forward or drive field to establish a counter-field opposing said forward or drive field, said drive or exciting winding and said at least one secondary or sense winding being accommodated in a displaceable sensor portion attachable to a tracked vehicle and said at least one conductive screen being aligned with the intended path of movement of the tracked vehicle said secondary or sense winding being shaded to a varying extent by said at least one conductive screen when said displaceable sensor portion is moved into the vicinity of said at least one conductive screen to thereby vary the voltage induced in said at least one secondary or sense winding and said at least one secondary or sense winding being oriented to provide a voltage output indicative of the presence of said displaceable sensor portion in the vicinity of said at least one conductive screen, said drive or exciting winding being configured so that in the absence of said at least one conductive screen said forward or drive field is substantially even over said at least one secondary or sense winding in the direction of travel of said tracked vehicle, said at least one secondary or sense winding being a two-terminal winding, and said at least one conductive screen having a surface region which is substantially parallel to a notional surface defined by said at least one secondary or sense winding.

9. A vehicle guidance system according to claim 8, wherein said at least one conductive screen consists of a portion of conductive material disposed relative to the track by which said tracked vehicle is guided so that said at least one conductive screen is located in the vicinity of said at least one secondary or sense winding when said displaceable sensor portion is substantially aligned with said conductive screen.

10. A vehicle guidance system according to claim 8, comprising a screening element attachable to said tracked vehicle, said screening element being located to shade said at least one secondary or sense winding of a further tracked vehicle to the immediate rear of said tracked vehicle in the event of said further tracked vehicle approaching said first-mentioned tracked vehicle too closely.

11. A guidance system for steerable vehicles comprising a drive or exciting winding for establishing a forward or drive field, at least one secondary or sense winding in which a voltage may be induced in the presence of said forward or drive field, and at least one conductive screen within which eddy currents are generated in the presence of said forward or drive field to establish a counter-field opposing said forward or drive field, said drive or exciting winding and said at least one secondary or sense winding being accommodated in a displaceable sensor portion attachable to a vehicle to be guided by the system and said at least one conductive screen being aligned with an intended path of movement of said vehicle said secondary or sense winding being shaded to a varying extent by said at least one conductive screen when said displaceable sensor portion is in the vicinity of said at least one conductive screen to thereby vary the voltage induced in said at least one secondary or sense winding and said at least one secondary or sense winding being oriented to provide a varying voltage output substantially indicative of the position of said displaceable sensor portion relative to said at least one conductive screen in a single direction of relative displacement of said displaceable sensor portion and said at least one conductive screen, said drive or exciting winding being configured so that in the absence of said at least one conductive screen said forward or drive field is substantially even over said at least one secondary or sense winding in said single direction of relative displacement of said displaceable sensor portion and said at least one conductive screen, said at least one secondary or sense winding being a two-terminal winding, and said at least one conductive screen defining a plane which is substantially parallel to a notional surface defined by said at least one secondary or sense winding.

12. A guidance system according to claim 11, wherein said at least one conductive screen is a continuous strip of conductive material and said at least one secondary or sense winding has phase and anti-phase coils aligned at right angles to the longitudinal direction of the conductive strip when said vehicle is on said intended path of movement and said displaceable sensor portion is aligned with said continuous conductive material strip so that deviations of the vehicle from said intended path of movement generate a correcting output signal from said at least one secondary or sense winding.

13. A guidance system according to claim 11, wherein said at least one conductive screen is one of a plurality of conductive screens located along an intended path of movement of the vehicle, said at least one secondary or sense winding has phase and anti-phase coils aligned at right angles to said intended path of movement when said vehicle is on said intended path of movement and said displaceable sensor portion is aligned with said intended path of movement, so that deviations of the vehicle from said intended path of movement generate a correcting output signal from said at least one secondary or sense winding, and said displaceable sensor portion comprises a second secondary or sense winding, said second secondary or sense winding having phase and anti-phase coils arranged in alignment with said intended path of movement, so that output signals from said second secondary or sense winding during movement of said vehicle along said intended path of movement provide position information for the vehicle in the direction of said intended path of movement.

14. A guidance system according to claim 12, wherein at least one of said plurality of conductive screens is defined by a two-terminal loop of conductive material, and switch means are provided for connecting the terminals of said two-terminal loop to close said two-terminal loop for flow of eddy currents therethrough in the presence of said forward or drive field.

15. A guidance system according to claim 14, wherein said at least one of said plurality of conductive screens is one of a first plurality of two-terminal loops of conductive material, said first plurality defining a portion of a first intended path of movement for said vehicle, and the system also comprises a second plurality of two-terminal loops of conductive material, said second plurality defining a second path of movement for said vehicle, said second path deviating from said first intended path of movement, switch means being provided for each two-terminal loop of said first and second pluralities of two-terminal loops for closing said each loop for flow of eddy currents therethrough, the switch means of each of said first plurality of two-terminal loops being closed for guiding said vehicle along said first intended path of movement and the switch means of each of said second plurality of two-terminal loops being closed to cause said vehicle to deviate from said first intended path of movement along said second path of movement.

16. A guidance system according to claim 13, wherein the conductive screens of said plurality of conductive screens are disposed at a series of equally spaced apart locations along said intended path of movement of said vehicle.

17. A guidance system according to claim 16, wherein said conductive screens of said plurality of conductive screens are defined by a series of conductive regions, said series extending along the surface over which said vehicle operates.

18. A guidance system according to claim 17, wherein said conductive regions are provided on a length of strip material.

19. A guidance system according to claim 17, wherein each conductive region is a separate entity adhered to said surface.

20. A sensing system comprising a drive or exciting winding for establishing a forward or drive field, two secondary or sense windings in each of which a voltage may be induced in the presence of said forward or drive field, and two series of conductive screens, eddy currents being generated in said conductive screens in the presence of said forward or drive field to establish a counter-field opposing said forward or drive field, said drive or exciting winding and said two secondary or sense windings being accommodated in a displaceable sensor portion and said two series of conductive screens being fixedly located relative to said displaceable sensor portion, each of said secondary or sense windings being shaded to a varying extent by a conductive screen of a respective one of said two series of conductive screens when said displaceable sensor portion is moved into the vicinity of said conductive screen to thereby vary the voltage induced in said secondary or sense winding and each of said two secondary or sense windings being oriented to provide a varying voltage output substantially indicative of the position of said displaceable sensor portion relative to said two series of conductive screens in a single direction of relative displacement of said displaceable sensor portion and said two series of conductive screens, said drive or exciting winding being configured so that in the absence of said conductive screens, said forward or drive field is substantially even over said two secondary or sense windings in said single direction of relative displacement of said displaceable sensor portion and said two series of conductive screens, each of said two secondary or sense windings being a two-terminal winding, each of said conductive screens having a surface region which is substantially parallel to a notional surface defined by said two secondary or sense windings, and the number of conductive screens of one of said series of conductive screens differing from the number of conductive screens of the other of said series of conductive screens.

21. A sensing system according to claim 20, wherein said series of conductive screens are defined by a plurality of conductive regions provided on a length of strip material.

22. A screened inductance sensor system comprising a drive or exciting winding for establishing a forward or drive field, means for energising the drive winding to set up an alternating magnetic field, at least one secondary or sense winding in which a voltage may be induced in the presence of said forward or drive field, at least one conductive screen within which eddy currents are generated in the presence of said forward or drive field to establish a counter-field opposing said forward or drive field, said drive or exciting winding and said at least one secondary or sense winding being accommodated in a displaceable sensor portion and said at least one conductive screen being fixedly located relative to said displaceable sensor portion, said secondary or sense winding being shaded to a varying extent by said at least one conductive screen when said displaceable sensor portion is in the vicinity of said at least one conductive screen to thereby vary the voltage induced in said at least one secondary or sense winding and said at least one secondary or sense winding being oriented to provide a varying voltage output substantially indicative of the position of said displaceable sensor portion relative to said at least one conductive screen in a single direction of relative displacement of said displaceable sensor portion and said at least one conductive screen, said drive or exciting winding being configured so that in the absence of said at least one conductive screen said forward or drive field is substantially even over said at least one secondary or sense winding in said single direction of relative displacement of said at least one displaceable sensor portion and said at least one conductive screen, said at least one secondary or sense winding being a two-terminal winding, said at least one conductive screen defining a plane which is substantially parallel to a notional surface defined by said at least one secondary or sense winding, and the system comprising means for measuring said varying voltage output of said at least one secondary or sense winding to provide at least an indication of the relative position of the displaceable sensor portion and said at least one conductive screen.

* * * * *